United States Patent [19]
Di Renzo et al.

[11] Patent Number: 6,063,944
[45] Date of Patent: May 16, 2000

[54] METHOD FOR PREPARING LATTICE-INSERTED TITANIUM ZEOLITES, AND USE THEREOF

[75] Inventors: Francesco Di Renzo, Montpellier; Sylvie Gomez, Meze; Francois Fajula, Teyran; Remy Teissier, Francheville, all of France

[73] Assignee: Elf Aquitaine, Courbevoie, France

[21] Appl. No.: 09/000,195

[22] PCT Filed: Jul. 31, 1996

[86] PCT No.: PCT/FR96/01209

§ 371 Date: May 4, 1998

§ 102(e) Date: May 4, 1998

[87] PCT Pub. No.: WO97/05060

PCT Pub. Date: Feb. 13, 1997

[30] Foreign Application Priority Data

Aug. 2, 1995 [FR] France ................................. 95 09436

[51] Int. Cl.⁷ .................................................. C07D 301/12
[52] U.S. Cl. ........................... 549/531; 549/523; 549/524; 423/713; 423/714; 423/715; 502/78; 502/79; 502/85

[58] Field of Search ...................................... 423/713, 714, 423/715; 502/85, 78, 79; 549/523, 524, 531

[56] References Cited

U.S. PATENT DOCUMENTS

| | | | |
|---|---|---|---|
| 5,453,263 | 9/1995 | Blosser et al. | 423/713 |
| 5,527,520 | 6/1996 | Saxton et al. | 423/706 |
| 5,695,736 | 12/1997 | Saxton et al. | 423/700 |
| 5,869,706 | 2/1999 | Dartt et al. | 549/531 |
| 5,882,624 | 3/1999 | Kuznicki et al. | 423/700 |

*Primary Examiner*—Tom Dunn
*Attorney, Agent, or Firm*—Burgess, Ryan & Wayne

[57] ABSTRACT

A method is provided for preparing fully lattice-inserted titanium zeolites by post-synthesis processing of the synthetic zeolite optionally containing titanium with an inorganic acid, wherein the post-synthesis processing comprises processing the zeolite in the presence of at least one titanium source with a solution containing at least one oxidizing inorganic acid having a higher redox potential than an acidic tetravalent titanium solution. The invention is also directed to the use of the zeolites.

11 Claims, No Drawings

METHOD FOR PREPARING LATTICE-INSERTED TITANIUM ZEOLITES, AND USE THEREOF

This appln. is a 371 of PCT/FR96/01209 filed Jul. 31, 1996, based on FR 95/09436, filed Aug. 2, 1995.

BACKGROUND OF THE INVENTION

1) Field of the Invention

The present invention is directed towards a process for obtaining zeolites with titanium inserted into the lattice, starting with synthesized or commercial zeolites, with or without titanium. The invention is directed more particularly towards obtaining zeolites with titanium inserted into the lattice, which can be used in catalysts for the controlled oxidation of organic molecules in the presence of hydrogen peroxide and hydroperoxides, improving the insertion of titanium and removing the extra-lattice titanium, thereby favouring an increase in the activity, stability and efficacy of these catalysts.

2) Background Art

Among the synthesized titanium zeolites, the one most extensively studied is titanosilicalite TS-1, of structural type MFI described in U.S. Pat. No. 4,410,501, the catalytic applications of which cover, inter alia, the hydroxylation of aromatic compounds, the epoxidation of olefins, the oxidation of paraffins and alcohols to ketones, and the ammoximation of cyclohexanone with aqueous ammonia. The studies on this solid have clearly shown that the catalytic properties of titanium zeolites are strictly associated with the method of preparation of the catalyst. If non-crystalline titanosilicates or solid titanium oxide are obtained instead of titanosilicalite crystals, the controlled oxidation reactions obtained in their presence are less selective and less effective. Moreover, it is known that the efficacy of the catalysts depends on the level of insertion of the transition metals into the silicon structure of the zeolite.

Titanium zeolites that are catalytically efficient are particularly difficult to prepare since, if the optimum synthesis conditions are not met, the titanium oxide coprecipitates with non-crystalline titanosilicates. The precipitation of these non-porous phases promotes depletion of titanium zeolite and decreases the selectivity and efficacy of the oxidation catalysts since it favours the decomposition of hydrogen peroxide.

In order to avoid this particularly inconveniencing coprecipitation during synthesis, it is preferred to use purified reagents, free of alkaline cations (see French patent application 94/00978 of Jan. 28, 1994) sometimes in the presence of hydrogen peroxide (see patent application WO 94/02245), which considerably increases the overall cost of the synthesis.

Since it is often difficult to control or reproduce these syntheses, methods for the post-synthesis treatment of titanium-free zeolites have been developed in order to insert titanium or any other transition metal into their structure.

Among the various post-synthesis treatments published, it has become apparent that by treating protonic zeolites of MFI, faujasite or BEA type with $TiCl_4$ vapours, some of the aluminium contained in the structure was extracted in the form of $AlCl_3$ vapour and replaced by titanium. (B. Kraushaar and J. Van Hoof, Catalysis Letters 1, 1988, 81). However, since all of these vapours are corrosive, this post-synthesis treatment cannot be viably and easily implemented on an industrial scale. In order to circumvent this major drawback, treatments with titanium halides in solution have been studied: J. Kooyman, J. C. Jansen and H. Van Bekkum in Proceedings of 9th International Zeolite Conference, Montreal 1992, Butterworth-Heinemann 1993, volume 1, 505, treated, in particular, MFI zeolites with solutions of $TiF_3$ in the presence of dilute hydrofluoric acid (HF). Other workers have treated beta-zeolite with solutions of $TiF_3$ dissolved in dilute hydrochloric acid (see French patent application 2,694,549 (Plee, Nicolas)). The zeolites obtained by these methods do not appear to be sufficiently active as regards oxidation.

Other researchers have preferred to treat aluminium-rich zeolites such as faujasite, LTL, mazzite, MER, MFI and mordenite with an aqueous solution of $(NH_4)_2TiF_6$, as in patent application WO 85/04854.

However, it has been observed that the amount of aluminium present in the structure still remained large, that most of the titanium appeared in the form of extra-lattice titanium oxide and, lastly, that the zeolites obtained were not suitable for the catalysis of controlled oxidation reactions. This inadequacy of zeolites is also partly associated with the presence of acidic sites, especially with the presence of aluminium atoms in the silicon structure.

In order to limit, or even eliminate, the presence of extra-lattice titanium, i.e. titanium not inserted into the zeolite structure, and that of acidic sites, the present invention is aimed at obtaining titanium zeolites inserted into the lattice, by a simple and industrially exploitable treatment. This treatment is a post-synthesis treatment of zeolites with or without titanium, the titanium atoms being partly located at the surface or partly inserted into the structure, which makes it possible either to limit the synthesis steps or to enhance considerably the selectivity and activity of the catalyst comprising the zeolite with regard to controlled oxidation reactions. In addition, this post-synthesis treatment is directed towards obtaining titanium zeolites of greater stability and higher crystallinity, even in strongly acidic medium.

SUMMARY OF THE INVENTION

The subject of the present invention is thus a process for obtaining a zeolite with titanium fully inserted into the lattice, comprising a post-synthesis treatment, with an inorganic acid, of the zeolite synthesized with or without titanium, characterized in that the said post-synthesis treatment consists in treating the said zeolite in the presence of at least one source of titanium, with a solution containing at least one oxidizing inorganic acid whose redox potential is greater than that of tetravalent titanium in acidic solution.

DESCRIPTION OF THE PREFERRED EMBODIMENTS

For the process according to the invention, the soluble source of titanium is chosen from the group consisting of organic and inorganic titanium sources of higher solubility than terminal zeolites.

In a preferred form of the process, the source is either a commercial or non-commercial titanium zeolite, or a titanium salt, the combination of these two sources not being excluded.

A first soluble source of titanium according to the invention corresponds to amorphous metallosilicates and oxides located at the surface of the zeolite during synthesis in the presence of titanium. The extra-lattice titanium is dissolved by the oxidizing acid and then introduced into the zeolite structure from which the aluminium atoms are simultaneously extracted.

A second soluble source of titanium can originate from aqueous solutions preformed either in the acidic solution or in a solution which is separate from the said acidic solution with which it is subsequently mixed. The treated zeolite can be a zeolite synthesized in the presence of titanium or a titanium-free zeolite. This second source can optionally be combined with the first source in order to insert titanium The dissolution of the amorphous titanium located at the surface of the zeolite is promoted for its insertion into the structure, the titanium in the preformed solution making it possible to complete the amount of titanium required to fill all the available sites in the zeolite, their number being limited by the actual structure of the starting zeolite. There is equilibration of the concentrations in solution as the titanium is inserted into the zeolite lattice. Any source of titanium with an oxidation state of less than or equal to four can be used.

The preferred soluble titanium sources for the preformed solutions comprise at least one titanium salt from the group consisting of titanium alkoxides, titanium nitrates, sulphates, phosphates, perchlorates and halides, titanium dioxide and titanosilicate.

In order to carry out the present invention, the oxidizing inorganic acid is preferably chosen from the group consisting of nitric acid, fluorosulphonic acid and perchloric acid; these acids can be replaced by the corresponding anhydrides, taken alone or as a mixture.

It has been observed that the selective use of these oxidizing inorganic acids with a redox potential higher than or equal to that of the tetravalent titanium in acid solution makes it possible not only to dealuminize the zeolite but also promotes the replacement of aluminium atoms by titanium atoms in the structure, which was unexpected in the current state of knowledge of those skilled in the art, the silicon atoms generally replacing the aluminium atoms in the course of a standard de-alumination by acidic attack. This insertion of titanium into the reticular defects of the zeolite after departure of the aluminium is all the more surprising since, although it is also a metal of tetravalent structure, titanium atoms are much larger than silicon atoms. In addition, zeolites thus titanium-exchanged show greater stability in very concentrated acidic medium and greater crystallinity.

One possible explanation for the efficacy of the oxidizing acids for the insertion of titanium into the zeolite lattice is based on the redox potential of titanium in aqueous solution. Oxidized species containing tetravalent titanium have positive redox potential, which is thus higher than the potential of the hydrogen electrode. The result of this is that the tetravalent titanium in solution can be reduced by the proton of an acidic solution, but, in reduced form, it cannot be inserted as effectively into the structure of a zeolite. This explanation is not supposed to be a limitation of the properties of oxidizing acids; however, it can aid in understanding the low efficiency observed for reducing acids, such as 1.3M hydrochloric acid used in Example 3 of application WO 94/02245. This application describes a post-synthesis treatment of beta-zeolite with titanium in order to improve its activity in the catalysis of oxidation of n-hexane and cyclohexane with, as equivalent alternatives, treatments with an inorganic base or steam.

Furthermore, the post-synthesis treatment according to the invention applies irrespective of the mode of synthesis of the zeolites with identical efficiency. It adapts to any zeolite, whether or not the zeolite contains titanium in its structure prior to the post-synthesis treatment.

In one particular embodiment of the invention, when the Si/Al ratio is low, i.e. less than 5 in the zeolite, it is preferable to include a step of dealumination in order to increase this ratio and thereby avoid any risk of dissolution of the treated zeolite, it being possible for this de-alumination step to proceed or be carried out jointly with the post-synthesis treatment.

Thus, in a preferred form of the invention, the solution containing at least one oxidizing acid can also contain an inorganic or organic reducing acid, with an oxidizing potential less than the reducing potential of the proton(s) which they contain with respect to titanium, these acids promoting the extraction of aluminium atoms and their replacement by silicon atoms in the zeolite structure.

Among the preferred reducing and de-aluminizing acids, mention may be made of hydrochloric acid, phosphoric acid and carboxylic acids.

Similarly, in another embodiment, an alternation of steps of de-alumination and of post-synthesis treatment may be envisaged, without departing from the scope of the present invention, by preparing separate solutions of these reducing acids and of the oxidizing acids.

When the Si/Al ratio is greater than 5, the post-synthesis treatment according to the invention can be applied directly to the synthesis zeolite, the dealumination being carried out jointly with the insertion of titanium into the structure, the amount of silicon atoms being sufficient to keep this structure rigid. The use of common solutions of oxidizing and reducing acids makes it possible to speed up the process of titanium insertion into the zeolite structure.

A second subject of the invention is the application of the process for obtaining zeolites with titanium fully inserted into the lattice, for the production of titanium EMT, mordenite, beta-zeolites and faujasites.

A third subject of the invention relates to zeolites with titanium inserted into the lattice, which are obtained by the process of the invention.

A fourth subject of the invention is the use of these zeolites with titanium inserted into the lattice in catalysts for the oxidation of hydrocarbon compounds in the presence of hydrogen peroxide in preference to the organic or inorganic peroxides usually used, such as potassium persulphate or butyl hydroperoxide, which are more expensive and harmful to the environment. Needless to say, these zeolites can be used as they are in the oxidation catalysts or after deposition of other metals.

In order to illustrate the invention, examples are given below by way of non-limiting illustration.

EXAMPLE 1

The present example is aimed at emphasizing the unexpected specificity of so-called oxidizing acids for inserting titanium into the zeolite lattice when compared with so-called reducing acids.

Five samples of the same batch of beta-zeolite with an Si/Al ratio =19 were treated with different acid solutions. For each treatment, 5 g of zeolite and 0.25 ml of titanium tetrabutoxide were stirred overnight in a Pyrex (registered trademark) round-bottomed flask containing 500 ml of acidic solution at reflux temperature. At the end of the treatment, the solid was recovered by filtration, washed until the washing water was neutral and air-dried at 80° C. The types of acid and the concentration of the solutions used, as well as the Ti/Si ratio of the treated solid are given in Table 1. As a guide, the standard reduction potentials of the anion of the acid used are also given in this table.

TABLE 1

| treatment solution | final Ti/Si | E*/V |
|---|---|---|
| 10M HClO$_4$ | 0.010 | +1.189 |
| 16M HNO$_3$ | 0.010 | +0.934 |
| 14M H$_2$SO$_4$ | 0.001 | +0.172 |
| 15M H$_3$PO$_4$ | 0.000 | -0.276 |
| 11M HCl | 0.003 | — |

In order to observe the influence of the state of the titanium in the solid on the catalytic properties of the zeolite, the influence of its degree of dispersion or its coordination state, several spectroscopic and crystallographic methods were proposed. The method which best allows direct characterization of the state of titanium in titanosilicates is ultraviolet diffuse reflection spectroscopy. In the context of this patent, a working definition of the tetrahedral lattice titanium is accepted as the species which correspond(s) to an absorption band maximum at 48,000±2000 cm$^{-1}$. Other interpretations given to this band should not alter the correspondence observed between the presence of the band and the good catalytic properties of the solids.

In the present example, the ultraviolet diffuse reflection spectra of the zeolites treated with nitric acid and with perchloric acid show a single intense band with a maximum at 48,000 cm$^{-1}$. The spectrum of the zeolite treated with sulphuric acid shows two bands of weak intensity with maxima at 33,000 and 42,000 cm$^{-1}$. The zeolite treated with hydrochloric acid shows two bands of weak intensity at 47,000 and 42,000 cm$^{-1}$ and a very weak absorption between 30,000 and 35,000 cm$^{-1}$.

It is observed that the treatments with nitric acid and perchloric acid are the only ones which allow almost quantitative incorporation of titanium into the zeolite, in the form of tetrahedral lattice titanium, corresponding to the absorption band at 48,000 cm$^{-1}$. Among the acids used, perchloric acid and nitric acid are the only ones to show a standard redox potential which is markedly higher than that of the species containing tetravalent titanium, which have a reduction potential which can reach +0.25 V.

On the other hand, all of the acids tested proved to be satisfactory from the point of view of dealumination of the zeolite, the Si/Al ratio of all the zeolites after treatment being greater than 500.

EXAMPLE 2

This example is aimed to show that, independently of the method of synthesis used, the post-synthesis treatment of the invention allows the production of titanium zeolite which is more effective with regard to controlled oxidation reactions, in particular reactions of epoxidation of cyclohexene in diglyme.

To this end, several samples of zeolites were prepared, others being commercial zeolites, but all were subjected to a post-synthesis treatment according to the invention.

A first treated zeolite, referred to hereinbelow as ZT1, was obtained by mixing 5 g of beta-zeolite of composition 8.3TEAO$_2$.6Al$_2$O$_3$.100SiO$_2$ with 0.175 ml of titanium tetrabutoxide and 500 ml of 16M nitric acid. The mixture is stirred for 16 hours at reflux temperature. The solid phase is separated out by filtration and washed, firstly with 200 ml of 8M nitric acid and then with deionized water until neutral. The solid is then dried at 80° C. The zeolite thus treated has a Ti/Si ratio=0.07 and an Si/Al ratio<1000. On ultraviolet diffuse reflection spectroscopy, the solid shows a single intense band at 48,000 cm$^{-1}$, which is typical of titanium in tetrahedral coordination in zeolite.

A second titanium beta-zeolite, referred to hereinbelow as Z$_2$, was prepared starting with a gel of composition (9.6 Na$_2$O, 30 TEA$_2$O, 0.2 Al$_2$O$_3$, 17 B$_2$O$_3$, 1.7 TiO$_2$, 100 SiO$_2$, 2000 H$_2$O), in which TEA corresponds to the tetraethylammonium cation, the gel subsequently being treated hydrothermally at 150° C. under autogenous pressure. When observed by diffuse reflection spectroscopy, the Z$_2$ zeolite thus obtained shows a band at 48,000 cm$^{-1}$, typical of titanium in tetrahedral coordination in zeolite, and a shoulder at 37,000 cm$^{-1}$, characteristic of non-crystalline titanosilicalites. Observation by scanning electron microscopy confirmed the presence of traces of amorphous phase in the sample, along with the beta-zeolite. Point analysis by EDAX microprobe made it possible to show that the Z$_1$ zeolite had Si/Al ratios=170 and the amorphous titanosilicalite had an Si/Ti ratio=3.

The post-synthesis treatment consists in taking 5 g of Z$_2$, mixing them with 500 ml of 12M nitric acid and keeping the mixture stirred at reflux temperature for six hours. The mixture is then filtered and the solid phase recovered is washed until the washing waters are neutral and dried at 80° C. The ZT$_2$ zeolite recovered, whose diffractogram is still characteristic of a beta-zeolite, shows a band at 48,000 cm$^{-1}$ with no shoulder on ultra-violet diffuse spectroscopy. Analysis by EDAX microprobe and elemental analysis are in agreement on the composition of the sample, which shows an Si/Ti ratio=90. The micropore volume of the solid, measured by adsorption of n-hexane at W/W=0.12 after degassing at 200° C., is 0.16 ml/g.

A third zeolite Z$_3$ is obtained from 25 g of commercial de-aluminized faujasite with an Si/Al ratio=18.4, mixed with 750 µl of titanium tetrabutoxide and 2.5 liters of 16M nitric acid. The mixture is stirred at reflux temperature for 16 hours and the solid phase is then recovered by filtration, washed until the washing solution is neutral and dried at 80° C. The solid ZT$_3$ thus recovered shows the typical diffractogram of faujasite with no loss of crystallinity when compared with the starting zeolite. On the basis of the nitrogen adsorption at 77 K, the treated solid has a micropore volume of 0.26 ml/g. On ultraviolet diffuse reflection spectroscopy, ZT$_3$ shows a band at 48,000 cm$^{-1}$ with no shoulder characteristic of octahedral titanium in the structure, of amorphous titanosilicates or of titanium oxide.

These various zeolites ZT$_1$ to ZT$_3$ were tested in reactions of epoxidation of cyclohexene.

The oxidation tests consist in introducing into a thermostatically-regulated stirred reactor fitted with a reflux condenser and a device for introducing reagent:

26 grams of diglyme 41 grams of cyclohexene (0.5 mol)

2.5 grams of solid catalyst, ZT$_x$

This mixture is brought to a temperature of 80° C. with stirring and maintained at this temperature throughout the test. 1.26 grams of 70% H$_2$O$_2$ (0.026 mol) diluted in 10 grams of diglyme are run in over half an hour. The reaction lasts one and a half hours. The residual hydrogen peroxide is assayed by the standard method using iodine released by treatment with acidic KI.

In parallel, the cyclohexene oxide and the cyclohexanediol are assayed by gas chromatography.

In practice, an HP 5890 gas chromatograph is used with catharometric detection consisting of a 2M glass column with a diameter of between 4 and 6 mm, filled with chromosorb W with 5% carbowax, the injection and detection temperatures being 220° C. and 250° C. respectively.

The results obtained with these three zeolites ($ZT_1$ to $ZT_3$) and with zeolite $Z_2$ before treatment are collated in Table 2 below.

In this table, $TTG(H_2O_2)$ corresponds to the conversion of the hydrogen peroxide, i.e. to the following ratio:

$$TTG(H_2O_2) = \frac{\text{number of moles of } (H_2O_2) \text{ consumed} \times 100}{\text{number of moles of } (H_2O_2) \text{ introduced}}$$

The selectivities towards epoxidized compounds obtained and towards diol are calculated in the following way:

$$\text{epoxy salt} = \frac{\text{number of moles of epoxide formed} \times 100}{\text{number of moles of } (H_2O_2) \text{ consumed}}$$

and $$\text{diol salt} = \frac{\text{number of moles of diols formed} \times 100}{\text{number of moles of } (H_2O_2) \text{ consumed}}$$

TABLE 2

| catalyst | TTG $H_2O_2$ (%) | epoxide select. (%) | diol select. (%) |
| --- | --- | --- | --- |
| ZT1 | 84% | 74% | 14% |
| Z2 | 92% | 6% | 22% |
| ZT2 | 92% | 43% | 9% |
| ZT3 | 100% | 20% | 46% |

It is observed, in comparison with the zeolite ZT1, that titanium inserted into the structure of a dealuminized beta-zeolite is very selective for the production of cyclohexene oxide or corresponding epoxide.

If the results obtained with the zeolite Z2 (no post-synthesis treatment), which decomposes hydrogen peroxide, is compared with the zeolite ZT2 (after post-synthesis treatment), a marked increase in the total selectivity towards oxidation product is observed with the latter zeolite, but there is a substantial decrease in the selectivity towards diol corresponding to a decrease in its acidity.

With the zeolite ZT3, the efficacy of the post-synthesis treatment according to the invention is confirmed on zeolite structures other than beta-zeolite. Here, the high selectivity towards diol arises from the incomplete de-alumination of the aluminium-rich faujasite structure.

What is claimed is:

1. Process for obtaining a zeolite with titanium fully inserted into the lattice, comprising a post-synthesis treatment, with an inorganic acid, of the zeolite synthesized with or without titanium, wherein the said post-synthesis treatment comprises treating the said zeolite in the presence of at least one source of titanium, with a solution containing at least one oxidizing inorganic acid whose redox potential is greater than that of tetravalent titanium in acidic solution, said oxidizing inorganic acid being selected from the group consisting of nitric acid, perchloric acid and fluorosulphonic acid, taken alone or as a mixture.

2. The process according to claim 1, wherein the source of titanium is at least one member selected from the group consisting of a titanium zeolite and a titanium salt in solution.

3. Process according to claim 1 wherein a soluble source of titanium corresponds to amorphous oxides or metallosilicates located at the surface of a synthesized titanium zeolite.

4. Process according to claim 1 wherein a soluble source of titanium originates from solutions preformed in water or in the acid solution.

5. Process according to claim 1 wherein the source of titanium in the preformed solution corresponds to at least one titanium salt from the group consisting of titanium alkoxides, nitrate, sulphate, phosphate, perchlorate and halides, titanium dioxide and titanosilicates.

6. The process of claim 1 wherein the zeolite is selected from the group consisting of titanium EMT, mordenites, beta-zeolites and faujasites.

7. Process according to claim 1 wherein the said acid is coupled with an inorganic or organic reducing acid of redox potential less than or equal to that of the tetravalent titanium in acid solution.

8. Process according to claim 1 wherein the said reducing acid is selected from the group consisting of inorganic acids and carboxylic acids.

9. The process of claim 8 wherein the inorganic acids are selected from the group consisting of hydrochloric acid and phosphoric acid.

10. Zeolites obtained by applying the process according to claim 1.

11. In a process for the oxidation of hydrocarbons in the presence of hydrogen peroxide and a catalyst, the improvement which comprises employing as the catalyst the zeolite of claim 10.

* * * * *